Dec. 22, 1931.  C. A. STOLTZ ET AL  1,837,595
SOIL PULVERIZER
Filed April 20, 1928  2 Sheets-Sheet 1
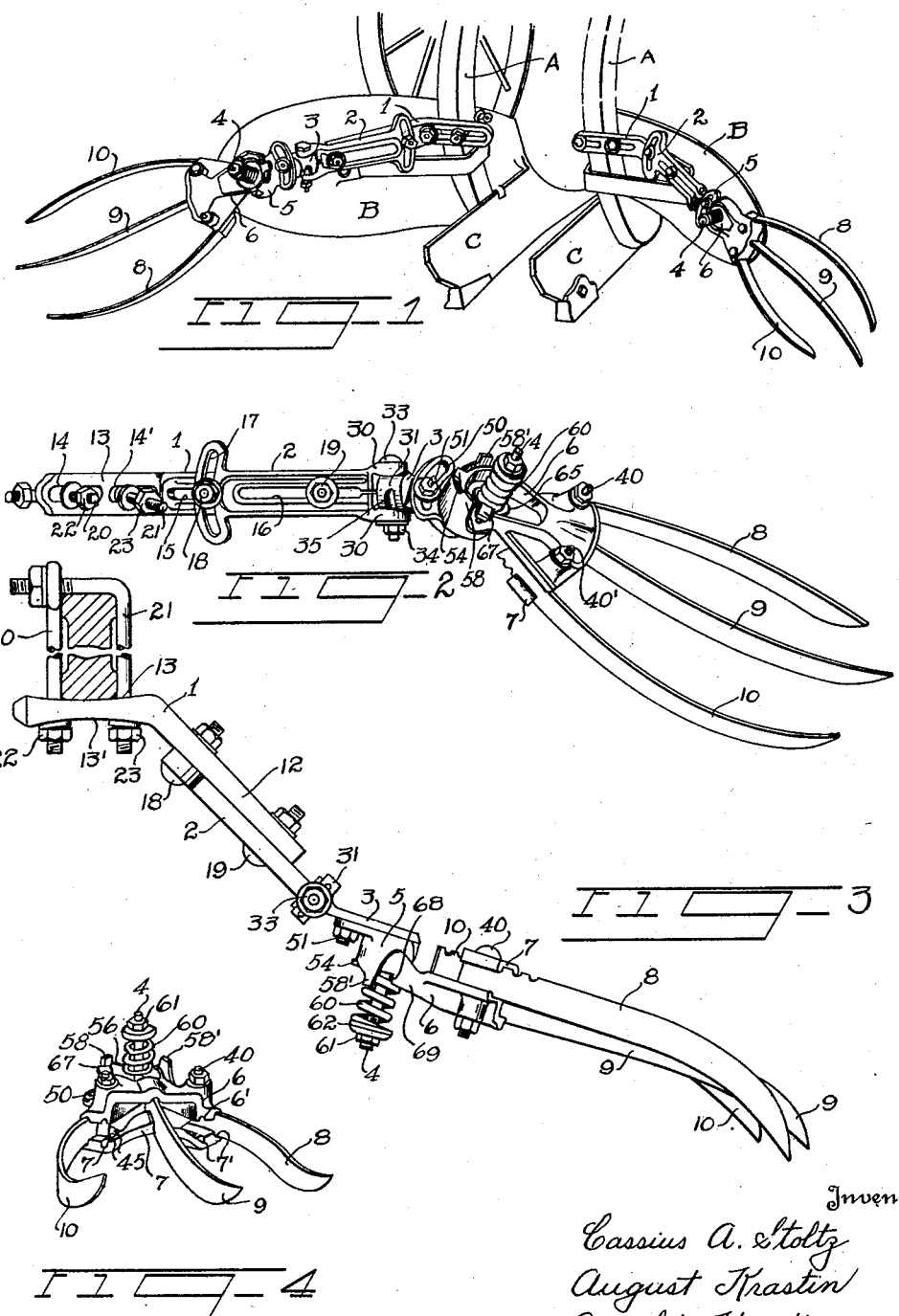
Inventors
Cassius A. Stoltz
August Krastin
Arnold Krastin
By Bates, Macklin, Golrick & Teare
Attorney

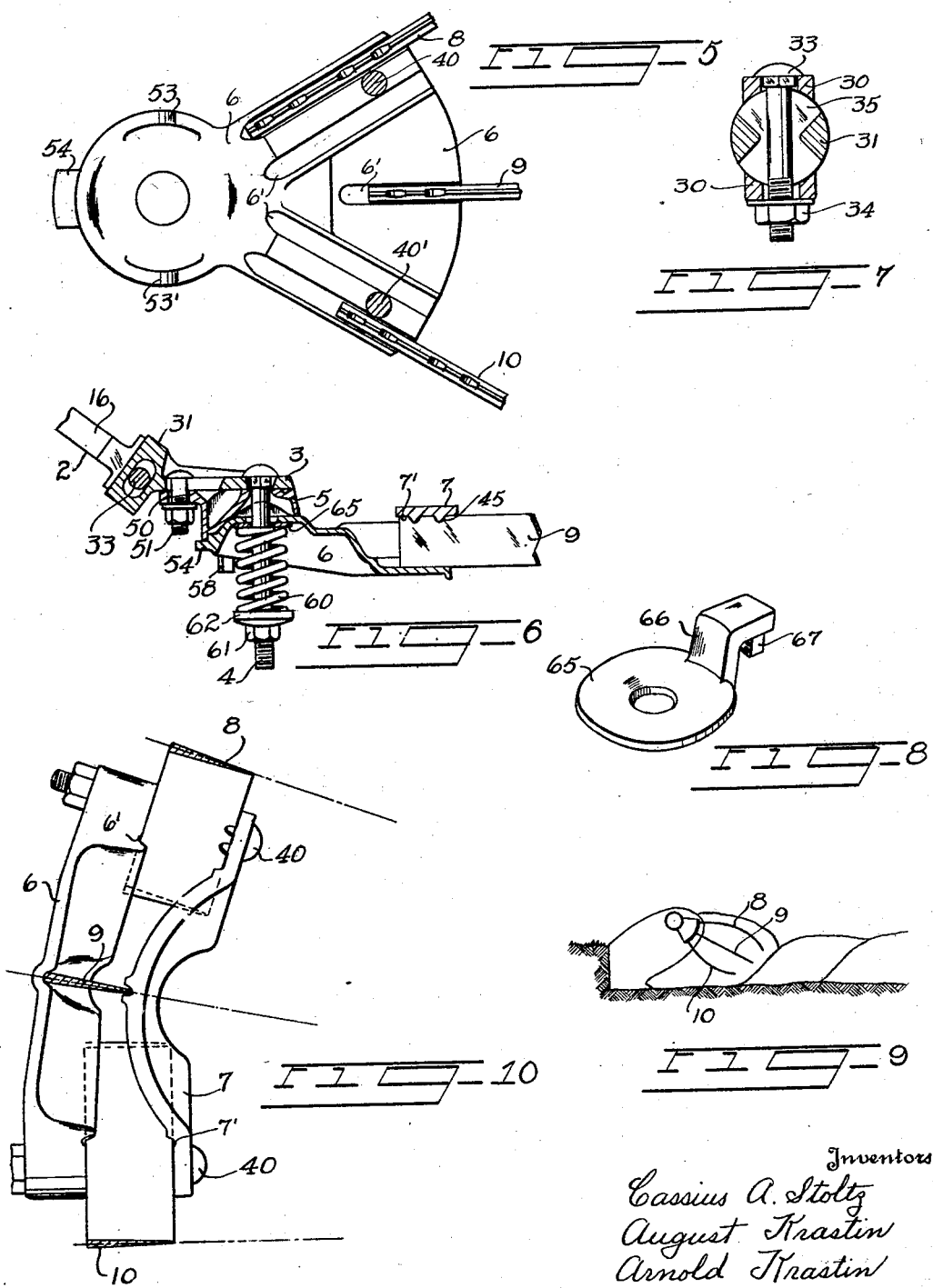

Patented Dec. 22, 1931

1,837,595

UNITED STATES PATENT OFFICE

CASSIUS A. STOLTZ, OF LAKEWOOD, AUGUST KRASTIN, OF CLEVELAND, AND ARNOLD KRASTIN, OF CLEVELAND HEIGHTS, OHIO, ASSIGNORS TO THE PLOW-MATE INCORPORATED, OF CLEVELAND, OHIO, A CORPORATION OF OHIO

SOIL PULVERIZER

Application filed April 20, 1928. Serial No. 271,433.

This invention relates to soil tilling implements, and particularly to an apparatus for use in connection with a plow for pulverizing the soil while being turned by the plow.

Certain features of the illustrated embodiment of the invention are publicly known by reason of the U. S. patent to C. A. Stoltz No. 1,548,067, issued August 4th, 1925, which patent is owned by the assignee of this application. The features in common are the following: a set of soil pulverizing tools positionable adjacent the delivery edge of the mold board of a plow; a support for the tools adapted to be secured to a rigid portion of the plow, and a mounting for the tools carried on the support and arranged to allow a yielding movement of the tools with reference to the support, so that the tools may yield in case of encountering a refractory substance in the furrow slice, thereby preventing breakage of either the tools or the support. The yielding movement is such that the tools, (shown as elongated blades or knives), may move flatwise and also in line with the direction of cut, the resistance to the flatwise movement being less than that opposing the other movement, whereby the tools may ordinarily yield flatwise to clear an obstruction, but will remain in active engagement with the furrow slice.

The pulverizing tools herein illustrated are very similar to those shown in the Stoltz patent, but improved for better action on the soil of the furrow, as will be hereinafter shown. The outstanding characteristics of the tools are: a downwardly bowed upper knife; an upwardly bowed lower knife; and a rearwardly offset intermediate knife, all the knives being inclined rearwardly at their ends in order to prevent raking action, such as would materially increase the draft of the plow.

In providing an implement of this character for use with plows that vary greatly according to size and make, perhaps the paramount problem is to arrange the device in such manner that it will have adequate strength when applied to the largest sized plows, and yet be capable of being sufficiently altered in size to fit the smallest plows. Other problems are concerned with the wide variation in relative position of the delivery edge of the mold board and the available point of attachment. Another serious problem is to so arrange the device that it may be attached at various heights along the beam, irrespective of the curvature thereof, while insuring that the pulverizing tools are brought into proper relationship with the mold board, since in many cases the most logical position for attachment is already occupied by some other device which the plow owner wishes to continue to use.

Great economy in manufacture and distribution may be effected by making the implement to interchangeably fit right and left hand plows. This presents a very complex problem, which, in addition to those above mentioned, has been solved by the present invention, as will be presently shown.

The general object of the invention is to provide a soil pulverizer which, in a given size, shall be universally adapted for equally effective use with the many different sizes and types of plows, both right and left hand.

Further objects include the provision of a simple effective device for preventing any of the tools from digging downwardly into unplowed soil, as at the base of the furrow, and which will prevent this equally well whether the device is used on a right or a left hand plow.

A further object is to provide an improved device for securing a soil tilling implement, such as a pulverizer, to a member such as the plow beam irrespective of variations in size and relative dimensions of such beam.

A further object is to provide a device for positioning a set of knives in such manner that, with the knives operating one above the other, the upper knife may lead the lower knife in variable degrees, irrespective of whether the device is used on a right or left hand plow.

A still further object is to provide an improved design and arrangement of knives and clamping means therefor, whereby a given set of knives may operate equally well with right and left hand plows.

Other novel features will be discussed as such in the following description relating to the accompanying drawings, wherein we show the preferred form of the invention. The essential novel characteristics are summarized in the claims.

In the drawings, Fig. 1 is a fragmentary perspective view of the rear end of a plow having both right and left hand mold boards and showing two pulverizers, one attached to each beam; Fig. 2 is a rear elevation of the pulverizer; Fig. 3 is a plan view thereof; Fig. 4 is an end elevation of the tool clamping device and the tools; Fig. 5 is a plan view of one element of the tool clamping device showing the tools in place thereon; Fig. 6 is a fragmentary central cross sectional view through the tool clamping device and showing the yielding connection between the tools and arm; Fig. 7 is a cross sectional view, as indicated by the line 7—7 on Fig. 2; Fig. 8 is a perspective view of one member of a device for preventing the lowermost blade from digging into dead soil; Fig. 9 is a diagrammatic illustration showing the relation of the tools to a furrow slice as the same is being turned by the mold board of the plow; and Fig. 10 is a sectional diagrammatic illustration showing an alternate construction of tool clamping device and showing the operating relationship of the tools to a vertical plane longitudinally cutting the tools.

The plow, shown in Fig. 1, is the conventional breaking plow, but employing two beams A supporting respective mold boards B, and land-sides C. The term "beam", as herein used in the specification and claims, is intended to mean any equivalent arrangement forming a general frame or support for the plow parts, and the term "mold board", any equivalent furrow turning device, since the plow itself forms no part of the present invention.

The principal elements of the pulverizer, as shown, comprise arm sections 1 and 2, the former being attached to the beam, as will be hereinafter explained; a swivel joint section 3 carrying a pivot bolt 4; a cam device including parts 5 and 6 supported (at least in part) by the bolt; clamping means for the tools including an extension of the member 6 and clamping plate 7, and the tools, shown as elongated blades or knives and designated 8, 9 and 10.

The initial setting of the tools with reference to the mold board is effected by manipulation of the arm sections 1 and 2 which will be hereinafter referred to as the beam section and extension section respectively. The beam section is adapted to be applied at any one of the surfaces of the beam or corresponding plow part, and securely fastened thereto. The free end of this section is tapered as at 12. The extension section 2 may be clamped against either side of the taper, thus affording definite adjustment of the extension section forwardly and rearwardly with respect to the beam section, viz: if it is desired to swing the extension section forwardly in the direction of the plowing, this section will be applied to the rear side of the taper, if rearwardly, then to the front side.

In order that, with a given setting of the beam section, the extension section may be raised or lowered to adjust the tools in a vertical plane, and still permit the extension and retraction of the tools toward and from the support, both sections 1 and 2 are longitudinally slotted, and one is transversely slotted. As shown, the section 1 is longitudinally slotted at 15, and the section 2 longitudinally slotted at 16, and transversely slotted at 17. Clamping bolts 18 and 19 extend through respective slots, as shown, to hold the sections substantially rigid with each other when properly positioned. In order to raise and lower the end of the extension section after setting the arm for length, this section is swung about the bolt 19 as a pivot. It is a decided advantage to be able to thus effectively bend the arm in order that any position on the beam may be chosen at which to attach the beam section, and still bring the tools supported by the extension section to the right position at the mold board.

The arrangement for securing the beam section to the plow beam comprises forming both sides of the section where it overlies the beam with dished surfaces, as at 13 and 13', and longitudinally slotting the dished portion as at 14 and 14' for clamping bolts. The bolts comprise an "eye" bolt 20 which may extend through the aperture 14 and along one side of the beam, and an L-bolt 21 which may extend through the aperture 14', then along two adjacent sides of the beam, and finally through the eye of the eye bolt. This arrangement permits the attachment of the beam section at the front or rear of the beam, or at either side, whichever will bring the tools to the best position. In fastening the section at the front or rear of the beam, for example, as in Fig. 3, the section may be angularly adjusted in a horizontal plane by individual setting of the nuts 22 and 23. The dished surface favors this and allows a firmer grip than as tho the surfaces were planular, and in addition tends to cam the nuts inwardly toward the median plane of the beam.

In order to efficiently pulverize the soil while being turned by the plow, there are several conditions to be met. For example, the uppermost knife should lead the lowermost knife in the furrow slice. Further, the point of the uppermost knife should extend appreciably beyond that of the lowermost knife. Heretofore, special right and left arms and knife sets had to be provided, as well as special right and left knife clamp arrangements and special devices to prevent "digging in" of the lowermost blade. The manner of meeting the first condition, and whereby a single apparatus is both a left and right adaptation, will now be described.

At the free end of the arm section 2, we provide a swivel clamping joint permitting bodily rotation of the blades as a whole substantially about the axis of the arm section 2 (the extension section). One element of this clamp comprises a set of jaws 30 positioned on the free end of the extension section. These jaws have their inner surfaces arcuately formed to embrace a similarly formed head 31 on the member 3 of the mounting. The diameter of the head is such as to normally loosely fit the arcuate surfaces of the jaws so as to permit the head to be manually turned in the embrace of the jaws for adjusting purposes.

Means for clamping the jaws onto the head comprises, as shown, a bolt 33 and nut 34, the bolt extending through apertures in respective jaws, and through a radial slot 35 in the head 31 to prevent removal of the section 3 when effecting adjustment. The slot permits enough angular movement of the head, and therefore the blades, to allow the general plane of the blades to be inclined forwardly the necessary degree for right hand plow use, and to be inclined a similar degree in the opposite direction, so that when the device is used on a left hand plow the direction of inclination and angle thereof may be the same.

The swivel joint clamp also permits desirable variations from the normal inclined position in either direction. We find this adjustment to be valuable in case the arm is attached to some portion of the plow beam that is inclined from the vertical, thus giving the whole arm a corresponding angular inclination forwardly or rearwardly as the case may be. The swivel joint clamp permits such abnormal setting of the arm to be compensated for to finally obtain the right blade positions.

In order that the jaws may be relatively long in effect so as not to become bent in being forced onto the head 31, and in order not to unnecessarily elongate the section 2 in providing such jaws, we make the recess between the jaws lead to the slot 16. Thus, forcing the jaws toward each other simply flexes each side of the section opposite the slot, and by reason of this, the jaws will not remain permanently set when once clamped down on the head, but will spring open to free the head upon release of the bolt.

If desired, we may eliminate the swivel joint arrangement, above described, and use instead, a wedge-shaped circular plate (not shown), but which may be suitably constructed and adapted to lie between the members 3 and 5 and clamped in place by the bolts 4 and 51. Such plate may be variously turned to thus cause the general plane of the knives to incline forwardly in the direction of plowing for either right or left hand plow use.

In order that a single set of blades suffices for right and left hand plow use, we provide substantially identical upper and lower blades, and a cooperating blade clamp arrangement by reason of which either of the extreme blades (uppermost and lowermost) shall be extended in the desired relation to the other.

As shown, this includes the clamping portion of the member 6 and the clamp plate 7. These elements may be held together as by bolts 40 and 40'. Each member 6 and 7 is respectively recessed at 6' and 7' to receive the front and back edges of the blades. Each of the recesses in the plate 7 has a pair of projections 45, the blades having cooperating notches in pairs corresponding to the positions of the projections. It will be noted that the central blade 9 has one pair of notches, while the uppermost and lowermost blades have two pairs each.

The result of the above described arrangement is that the upper and lower blades have two extended positions relative to the clamp, and the intermediate blade has only one. Because of this arrangement, the upper and lower blades may be made identical, and in use the uppermost blade (8 or 10, depending on the position of the pulverizer, see Fig. 1), is simply extended, and the lower blade retracted, all the blades being positively prevented from endwise movement, when once set, by the interengagement of the projections, and blade notches. The reason for the relationship of blades above discussed, upper blade extended and lower retracted, will be apparent from inspection of Fig. 9. Reference may be had to the Reissue application of the above mentioned Stoltz patent (Serial No. 209,956, filed August 1, 1927) for a detailed discussion of the operation of a somewhat similar set of blades on the soil.

In order that the implement may be used for shallow or deep plowing, we provide blade holding recesses 6' and 7' on either side of the clamping bolts; the recesses (inwardly from the bolts) being for holding the upper and lower blades for shallow plowing, and the outer recess for deep plowing. If desired, of course, other blades may be inserted into the normally unoccupied recesses.

One of the important advantages resulting from the shaping and arrangement of blades is that, even in very refractory soils, tough sods, clay soils, etc., the application of the pulverizer to the plow does not perceptibly increase the draft. The main reasons for this are that the pulverizer acts on moving soil, that the curvature of the blades follows the path of the furrow slice as this leaves the mold board, and that the shredded slice is turned more easily than when in a comparatively heavy solid strand. Further the general plane of all the blades being inclined forwardly, the action of the blades is somewhat the same as the ordinary mold board extensions, namely to assist in completely turning the furrow.

In such forwardly inclined position it will be apparent that all the blades drawn forwardly in a straight line with the plow, will not slice directly into the earth, but that the blades 8 and 9 will act on the soil to push it aside. This is highly desirable especially as to the top blade which, operating to cut a thin ribbon off the top of the furrow slice, may, by reason of the back of the blade being higher than the cutting edge, raise the ribbon upwardly further tearing it apart and scattering the thus disrupted earth tending to level the plowed ground. The intermediate blade should also actively pulverize as well as cut, and, since this blade closely follows the top blade in its cutting action, it will not displace half the furrow slice, as would seen to be true at first glance, but simply that between it and the top blade. The lowermost blade however need only slice to perform its function, this action being enough to allow the weight of the upper part of the furrow to compress the thus broken lower part into the larger crevices (for example at the far corner of the furrow channel), thereby eliminating air pockets without having to roll the plowed field.

The preferred manner of obtaining the blade relationships above discussed consists in providing a blade holding device whereby any given portion of the upper blade inclines toward the plane of a corresponding portion of the intermediate blade, as in Fig. 10. Likewise the corresponding portion of the lowermost blade inclines forwardly toward the plane of such portion of the intermediate blade, but upwardly. Thus with the clamp adjusted about as shown, upper blade perceptibly leading the lower blade, the upper and intermediate blade both actively pulverize as well as slice, and the lowermost blade, for the most part, merely slices. The illustration shows the relationship of blades, etc., to a furrow while plowing with a right hand plow but as will be easily seen the same result obtains when the clamp is inverted for left hand plow use.

Substantially the same results above discussed with reference particularly to Fig. 10 may be obtained by using a blade clamping device which holds the blade shanks in planes radiating from a common line. In case such a device is used the cutting parts of the upper and lowermost blades might be twisted out of the planes of their shank portions into approximately the relationship shown in Fig. 10.

The device for yieldingly securing the blade carrying member 6 to the member 5, as previously mentioned, includes the pivot bolt 4 which extends from the swivel joint section 3 through the member 5 and member 6. The member 5 is provided, as shown in Fig. 2, with an arcuate slot at 50 which embraces a bolt 51 by which the member 5 is clamped to the member 3 in various angular positions. The purpose of the slot connection is to direct the blades downwardly at the proper angle with reference to the arm sections 1 and 2. The slot is so placed that setting the bolt 51 in the middle of the slot will project the center blade directly in line with the sections 2 and 3. Hence, for either right or left hand plows the bolt should be positioned toward one end or the other of the slot to incline this blade downwardly, as shown in Fig. 1.

The yielding connection between the members 5 and 6 includes coacting crown cams on these members and a stiff spring 60 for urging the cam elements into a definite relationship. The spring is carried on the bolt 4 which is removably rigid with the swivel joint section 3 and acts to force the member 6 toward the member 5. There are a pair of crown cam faces on the member 6, the high points of which are designated 53, there being matching depressions in the member 5. In addition, the member 6 has a projection 54 extending toward the arm and which rides on oppositely inclined faces 56 adjacent a central depression 57 in a rim formed on the member 5. The inclined faces 56 terminate in projections 58 and 58' parallel with the bolt 4, and which are for limiting the rotational movement of the member 6 with relation to the member 5 in either direction. The force with which the rotational movement is opposed is governed in part by the steepness of the cams, but may be varied by means of a nut 61 threaded on the rear end of the bolt and bearing on a cupped washer 62, fitting over the end of the spring.

When any of the blades encounters a refractory substance in the furrow slice, the blades may either move straight back, directly compressing the spring 60, or they may move laterally, that is to say, flatwise, thus glancing off the obstruction. In case a blade directly engages the obstruction and there is no camming tendency to cause the flatwise movement, then the spring is directly compressed, the member 6 moving about the point of engagement of the projection 54 and depression 57 as a fulcrum. It will thus be seen that it will be easier to move the blades flatwise by means of simply operating to change the relationship of the cam elements than to perform the direct yielding movement, hence, in most cases the blades will merely glance off the obstruction and stay in active position in the soil, merely shifting their position. After the obstruction has been passed the blades will be returned to normal position by the spring and cam faces.

A novel feature of the cam arrangement, above described, is that a comparatively easy movement of the blades is permitted relative to the arm, to prevent breaking the blades in case the plow operator attempts to back the plow with the blades still in the soil. In such case, the member 6 simply cants about the cam points 53, the projection 54 rising straight out of the depression 57. This acts to compress the spring but slightly, hence, such direct forward yielding is very unrestrained in comparison to the direct rearward yielding above discussed.

The means for preventing rotational movement of the blades in a downward direction, irrespective of whether the pulverizer is used with a right or left hand plow, comprises, as shown, a reversible washer-like member 65 having a projection 66 rising from one side thereof (see Fig. 8), the projection having an outwardly turned lip 67 adapted to fit into one or the other of two notches 68 in a rim or flange portion 69 of the member 6.

When once set, the spring holds the lip in the selected notch. Movement of the member 6 in a counter-clockwise direction, such as would allow the lower knife 10 to dig into dead soil at the base of the furrow, is prevented because the lip, and therefore the blade clamp, would be stopped by the adjacent projection 58 on the cam member 5. For left hand plows, the washer is simply reversed, that it to say, the lip is placed to engage the extension 58' on the member 5.

We claim:—

1. A soil pulverizer for plows, comprising a plurality of soil slicing blades, and an arm for supporting the blades, said arm comprising a plurality of sections, the end of one section being recessed to form an arcuate inner-surface, there being an adjacent section having a complementary arcuate external surface, and clamping means carried by the first mentioned section for clamping the two sections together in various relations to thereby change the general plane of the blades, said means positively engaging both sections to lock the two together, irrespective of the clamping action of said means.

2. A soil pulverizer for plows, comprising a plurality of blades, and a sectional supporting device therefor, one section having internally and arcuately recessed jaws, and another a radially slotted head, there being a clamping device extending through the slot and arranged to react on the jaws to force them against the head to clamp it.

3. A soil pulverizer for plows, comprising a plurality of soil slicing blades, and a sectional longitudinally extensible arm for supporting the blades from a rigid portion of the plow, one of the sections of the arm being longitudinally slotted to permit the extension, this section being recessed at its end to provide a pair of jaws, the recess communicating with the slot whereby deflection of the jaws is distributed along the section for a considerable distance, there being another section having a head for engaging between the jaws, and means arranged to act on the jaws to clamp the head in various adjusted positions.

4. In a soil pulverizer for plows, a plurality of soil cutting blades, one above the other, a clamp and means associated therewith for supporting the blades from a rigid portion of a plow, interlocking means between the clamp and the upper and lower blades formed to permit each blade to be extended relative to the clamp definite distances, said first named means being arranged to permit the clamp to be reversed end for end for right or left hand plows, whereby a single set of blades may be used without changing the general relationship of blades and clamp for either right or left hand plowing.

5. In a plow of the class described, a plurality of blades adapted to be positioned one above the other adjacent the mold board of the plow, a holder for the blades, a supporting member adapted to be rigidly secured to the plow, said holder being yieldingly pivoted on the supporting member and a reversible abutment device having an abutting connection with the holder and said member for preventing rotative movement of the holder in a given direction when in one position and in the opposite direction when in another position, whereby the lowermost blade is prevented from digging into unplowed soil in either right or left hand plowing.

6. In a plow, a support for a plurality of cutting blades including a normally rigid base and a movable blade holder carried thereby, the holder having a movement relative to the base forwardly and rearwardly substantially in the directions of cutting of the blades, and means including a coil spring bearing on the holder and two fulcrum members carried by the base and against which the spring normally forces the holder, said fulcrum members being unequally spaced relative to the axis of the spring, for restraining the rearward movement of the holder with greater force than the forward movement.

7. In a plow, having a frame and mold board, a plurality of soil cutting blades disposed adjacent the delivery edge of the mold board, means to support the blades, said means comprising an armed member adapted to be secured to the frame, one end of said arm member terminating in a yoke, the inner portions of said yoke being arcuately surfaced, a member for supporting said blades having a radially slotted, arcuately surfaced portion, said portion being adapted to be embraced by said yoke, and clamping means supported by the yoke and extending through the slot of said radially slotted portion, whereby the blades may be rotated about the longitudinal axis of the said portion.

8. The combination in a plow of a set of pulverizing blades, a holder adapted to support said blades, a two-part arm to support said holder, one part of said arm being wedge shaped and the other part being longitudinally and rotatably adjustable on either side of said wedge-shape arm, whereby said blades may be raised and lowered in two substantially vertically intersecting planes.

In testimony whereof, we hereunto affix our signatures.

ARNOLD KRASTIN.
AUGUST KRASTIN.
CASSIUS A. STOLTZ.